(12) United States Patent
Ferreira Moreno et al.

(10) Patent No.: US 10,575,069 B2
(45) Date of Patent: Feb. 25, 2020

(54) METHOD AND SYSTEM FOR AUTOMATICALLY CREATING NARRATIVE VISUALIZATIONS FROM AUDIOVISUAL CONTENT ACCORDING TO PATTERN DETECTION SUPPORTED BY COGNITIVE COMPUTING

(71) Applicant: International Business Machines Corporation, Armonk, NY (US)

(72) Inventors: Marcio Ferreira Moreno, Rio de Janeiro (BR); Rafael Rossi de Mello Brandao, Rio de Janeiro (BR); Renato Fontoura de Gusmão Cerqueira, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 15/848,395

(22) Filed: Dec. 20, 2017

(65) Prior Publication Data
US 2019/0191225 A1 Jun. 20, 2019

(51) Int. Cl.
*H04N 21/85* (2011.01)
*H04N 21/854* (2011.01)
(Continued)

(52) U.S. Cl.
CPC ....... *H04N 21/854* (2013.01); *G06K 9/00718* (2013.01); *G06K 9/00751* (2013.01); *G06K 9/6263* (2013.01)

(58) Field of Classification Search
CPC ............. H04N 21/854; G06K 9/00751; G06K 9/00718; G06K 9/6263
See application file for complete search history.

(56) References Cited

U.S. PATENT DOCUMENTS 6,392,133 B1  5/2002  Georges
6,912,544 B1  6/2005  Weiner
(Continued)

OTHER PUBLICATIONS

O. Steiger, "Personalized Content Preparation and Delivery for Universal Multimedia Access." TR-ITS-2005.010, Swiss Federal Institute of Technology (EPFL) Lausanne, Apr. 2005.
(Continued)

*Primary Examiner* — Qian Yang
(74) *Attorney, Agent, or Firm* — Ryan, Mason & Lewis, LLP

(57) ABSTRACT

Methods, systems, and computer program products for automatically creating narrative visualizations from audiovisual content according to pattern detection supported by cognitive computing techniques are provided herein. A computer-implemented method includes detecting patterns of organization within a provided selection of audiovisual content; matching the detected patterns of organization to pre-determined patterns of organization; applying, to one or more portions of the audiovisual content corresponding to the detected patterns of organization that match pre-determined patterns of organization, one or more visualization templates, wherein the visualization templates comprise items of additional audiovisual content, and wherein the visualization templates are associated with the pre-determined patterns of organization; and outputting to at least one user an enhanced version of the audiovisual content comprising the provided selection of audiovisual content modified in accordance with the applied visualization templates.

20 Claims, 7 Drawing Sheets

(51) Int. Cl.
*G06K 9/62* (2006.01)
*G06K 9/00* (2006.01)

(56) References Cited

U.S. PATENT DOCUMENTS

| | | | |
|---|---|---|---|
| 6,928,613 B1 | 8/2005 | Ishii et al. | |
| 7,444,659 B2 | 10/2008 | Lemmons | |
| 7,945,142 B2 | 5/2011 | Finkelstein et al. | |
| 8,477,994 B1 * | 7/2013 | Noshadi | H04N 1/00167 382/103 |
| 9,703,820 B2 | 7/2017 | Smith et al. | |
| 2005/0193335 A1 | 9/2005 | Dorai et al. | |
| 2010/0223223 A1 | 11/2010 | Sandler et al. | |
| 2012/0158850 A1 * | 6/2012 | Harrison | G06Q 50/01 709/205 |
| 2012/0274846 A1 * | 11/2012 | Kimura | G06T 11/60 348/441 |
| 2013/0187926 A1 | 7/2013 | Silverstein et al. | |
| 2013/0262092 A1 * | 10/2013 | Wasick | G06F 17/28 704/9 |
| 2013/0294751 A1 * | 11/2013 | Maeda | H04N 9/87 386/282 |
| 2014/0143252 A1 | 5/2014 | Silverstein et al. | |
| 2015/0082170 A1 * | 3/2015 | Mitchell | G06F 16/435 715/716 |
| 2015/0294025 A1 | 10/2015 | Wellen et al. | |

OTHER PUBLICATIONS

E. Segel, "Narrative Visualization: Telling Stories with Data." IEEE Transactions on Visualization and Computer Graphics: 16, 6 (Nov. 2010), 1139-1148.

F. Amini, "Understanding Data Videos: Looking at Narrative Visualization through the Cinematography Lens." In Proceedings of the 33rd Annual ACM Conference on Human Factors in Computing Systems (CHI '15). ACM, New York, NY, USA, 1459-1468, 2015.

V. Vijayakumar, "A study on video data mining." International Journal of Multimedia Information Retrieval, Oct. 2012, vol. 1, Issue 3, pp. 153-172.

A. Satyanarayan, "Authoring Narrative Visualizations with Ellipsis." Comput. Graph. Forum 33, 3 (Jun. 2014), 361-370.

University of Washington Tacoma, Course Outline and Schedule, TBGEN 490: "The Writer's Workshop: Skills for Success." Course offering of the Business Administration Program at the University of Washington Tacoma. http://faculty.washington.edu/ezent/impo.htm [Accessed Nov. 22, 2017].

M. H. R. Pereira, "A multimedia information system to support the discourse analysis of video recordings of television programs," 7th Iberian Conference on Information Systems and Technologies (CISTI 2012), Madrid, 2012, pp. 1-6.

IBM, "System and Method for Computational Media Aesthetics: An Algorithmic Study of the Use of Sound and Images in Digital Video and TV/Film for Augmented Content Annotation and Production, and Mass Communication." IP.com Disclosure No. IPCOM000010281D. Publication Date: Nov. 15, 2002.

Foote et al., Creating music videos using automatic media analysis, Proceedings of the 10th ACM International Conference on Multimedia, Dec. 2002.

Aigrain et al., The automatic real-time analysis of film editing and transition effects and its applications, Computers & Graphics, vol. 18, Issue 1, Jan.-Feb. 1994, pp. 93-103.

Deligne et al., Audio-visual speech enhancement with AVCDCN (audio-visual codebook dependent cepstral normalization), Sensor Array and Multichannel Signal Processing Workshop Proceedings, 2002.

* cited by examiner

METHOD AND SYSTEM FOR AUTOMATICALLY CREATING NARRATIVE VISUALIZATIONS FROM AUDIOVISUAL CONTENT ACCORDING TO PATTERN DETECTION SUPPORTED BY COGNITIVE COMPUTING

FIELD

The present application generally relates to information technology, and, more particularly, to enhancing audiovisual content.

BACKGROUND

Audiovisual content commonly used as a powerful storytelling resource. Such content can be used to deliver messages under different topics, such as educational pieces, news, entertainment, promotional campaigns, etc. However, producing and creating effective audiovisual content is a non-trivial task, requiring effort and investments so that the content can deliver the proposed message to the intended audience. Moreover, produced audiovisual content routinely fails in its task nonetheless, generally because the knowledge described in the content is not well-structured, not understandable or straightforward, or fails to engage the audience.

SUMMARY

In one embodiment of the present invention, techniques for automatically creating narrative visualizations from audiovisual content according to pattern detection supported by cognitive computing are provided. An exemplary computer-implemented method can include detecting one or more patterns of organization within a provided selection of audiovisual content, and matching the one or more detected patterns of organization to one or more pre-determined patterns of organization. Such a method also includes applying, to one or more portions of the audiovisual content corresponding to the one or more detected patterns of organization that match one or more of the pre-determined patterns of organization, one or more visualization templates, wherein the one or more visualization templates comprise one or more items of additional audiovisual content, and wherein the one or more visualization templates are associated with the one or more pre-determined patterns of organization. Additionally, such a method includes outputting to at least one user an enhanced version of the audiovisual content, wherein the enhanced version comprises the provided selection of audiovisual content modified in accordance with the one or more applied visualization templates.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
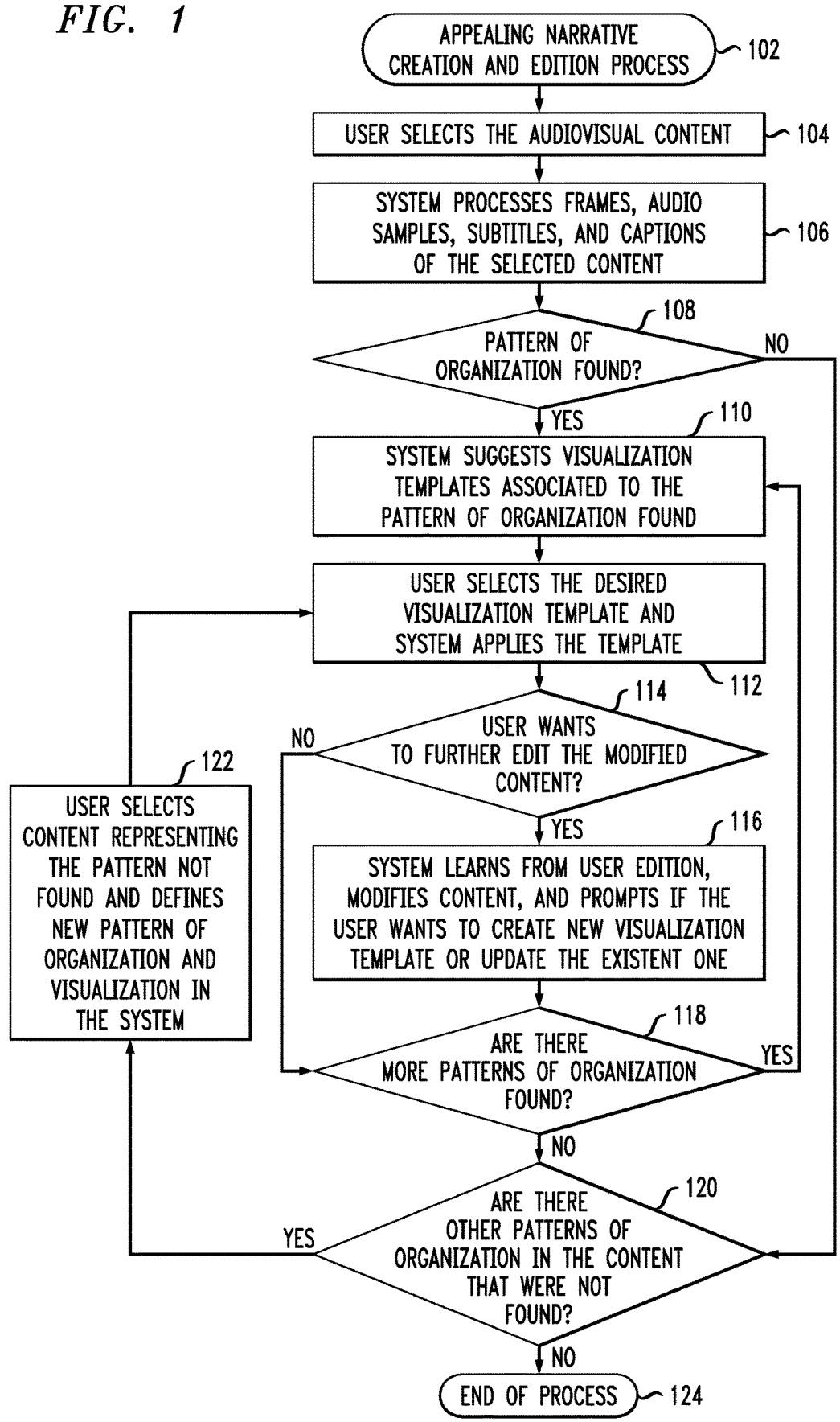
FIG. 1 is a flow diagram illustrating appealing narratives creation process techniques according to an embodiment of the present invention.

As described herein, an embodiment of the present invention includes automatically creating narrative visualizations from audiovisual content according to pattern detection supported by cognitive computing. As used herein, a narrative refers to an author's original message carrying one or more knowledge concepts to be assimilated by those who consume a given audiovisual content. A message can be deemed successful if its intended meaning is consistently understood by consumers. At least one embodiment of the invention includes processing audiovisual content to detect a narrative and one or more patterns of organization to automatically create enhanced visualizations. Common patterns of organization, such as compare-contrast, cause-effect, chronological, sequential, spatial, etc., can be structured as rules in a knowledge base (KB). User feedback, as well as the KB are considered when generating narratives. That is, at least one embodiment of the invention includes supporting diverse types of visualization strategies, and particularly considers the users' preferred strategies.

In one or more embodiments of the invention, the KB can also support rule modeling for the logical structure of narrative patterns. Also, the KB can store data used to train learning algorithms, wherein such data can be encoded in one or more formats (including text, image, video, audio, etc.) and can convey relevant features for pattern detection. Additional strategies and data can be added, creating more structured knowledge in the KB. Also, in at least one embodiment of the invention, a visual dashboard can be implemented that supports creation of narrative structures through a graphical user interface (GUI).

As detailed herein, effective communication can rely on a clear and logical organization of ideas, for both the producer and the consumer of knowledge in the form of narratives. For the narrative producer, patterns of organization can aid the production process, providing focus and direction of the narrative being composed. For the consumer, patterns of organizations can facilitate both the understanding and memorization of important concepts in the communicative process.

The process of creating appealing (that is, conceptually rich and/or enhanced) narratives can begin, for example, when a user wishes to enhance audiovisual content. In at least one embodiment of the invention, the user inputs the content through a graphical interface, which abstracts one or more functionalities. Such an embodiment can also include processing the content, examining for one or more patterns of organization that match one or more stored and/or pre-determined patterns of organization (stored in the KB). For each pattern of organization matched during content processing, at least one embodiment of the invention can include applying one or more narrative visualization templates to improve and/or enrich the content. As used herein, a narrative visualization template refers to a logical structure that aids in the presentation of narratives, with components for pre-defined audiovisual elements, style formatting, presentation rules, etc. The selection of narrative visualization templates can be based not only on the appropriateness of templates (determined via relationships among patterns of organization templates and visualization templates), but also on knowledge from the KB, which can represent previous successful narratives, user history and preferences, etc.

Visualization templates can be applied automatically or manually under user supervision. In the latter, for each suggested visualization template, the user can provide feedback (for example, indicating if another visualization template should be applied instead). The user can also edit the selected visualization template, modifying the template according to his or her needs. At the end of the content processing, at least one embodiment of the invention can include presenting to the user at least a partial result (an audiovisual narrative, for example), as well as providing a mechanism for the user to choose one or more alternatives or other corrections. Such an embodiment can include continuously learning from these types of user interactions. Ultimately, one or more embodiments of the invention include generating an appealing audiovisual narrative.

FIG. 1 is a flow diagram illustrating appealing narratives creation process techniques according to an embodiment of the present invention. Step 102 includes commencing an appealing narrative creation and edition process. Step 104 includes a user selecting the audiovisual content in question. In step 106, the system processes frames, audio samples, subtitles, and captions from the selected content. Step 108 includes determining whether any patterns of organization are found in the content. If no (that is, no patterns are found), then the workflow proceeds to step 120, which is detailed below. If yes (that is, one or more patterns are found), then step 110 includes the system suggesting one or more visualization templates associated with the one or more found patterns of organization.

In step 112, the user selects the desired visualization template(s) and applies the template to the content. Step 114 includes determining whether the user wants to further edit the modified content (that is, the content with the template(s) applied thereto). If no (that is, the user does not wish to further edit the modified content), the workflow continues to step 118, which is detailed below. If yes (that is, the user does wish to further edit the modified content), then step 116 includes the system learning from the user edition/modifications, and prompting the user to determine if the user wants to create a new visualization template or update the existing template.

Step 118 includes determining whether there are more patterns of organization found in the content. If yes, then the workflow returns to step 110. If no, then step 120 includes determining whether there are other patterns of organization in the content that was not initially found (in step 108). If yes, then in step 122, the user selects the content representing the pattern that was not originally found, and defines the new pattern of organization and visualization in the system. If the determination of step 120 is answered in the negative, then the process ends at step 124.

Figure 2:
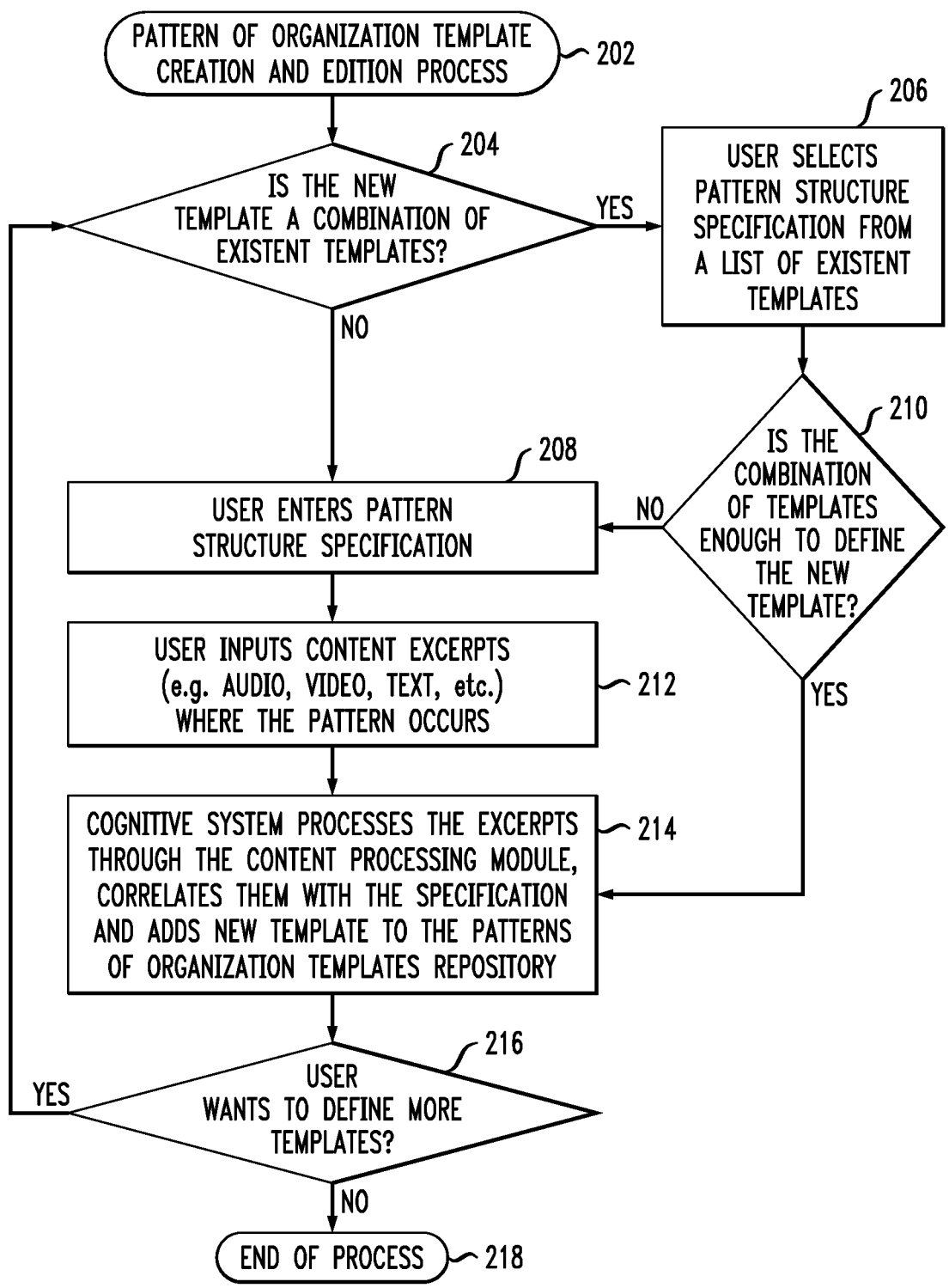
FIG. 2 is a flow diagram illustrating pattern of organization template creation process techniques according to an embodiment of the present invention.

As further detailed in FIG. 2, users can also create or edit patterns of organization to be detected by content processing.

Accordingly, FIG. 2 is a flow diagram illustrating pattern of organization template creation process techniques according to an embodiment of the present invention. Step 202 includes commencing a pattern of organization template creation and edition process. Step 204 includes determining whether the new template is a combination of existing templates. If yes (that is, the new template is a combination of existing templates), then the workflow continues to step 206, which includes the user selecting one or more pattern structure specifications from a list of existing templates, and, in step 210, determining if the combination of existing templates is sufficient to define the new template. If the determination of the query in step 204 is negative (that is, the new template is not a combination of existing templates), then the workflow continues to step 208, which includes the user entering a pattern structure specification.

Referring back to step 210, if the combination of templates is insufficient to define the new template, then the workflow proceeds to step 208. However, if the combination of templates is sufficient to define the new template, then the workflow continues to step 214, which is detailed below. Subsequent to the above-noted step 208, step 212 includes the user inputting content excerpts (for example, audio, video, text, etc.) where the pattern occurs. In step 214, a cognitive system (as further detailed in connection with FIG. 4) processes the excerpts through a content processing module, correlates the excerpts with the specification, and adds a new template to a patterns of organization templates repository.

Step 216 includes determining whether the user wants to define one or more additional templates. If yes, then the workflow returns to step 204. If no, then the process ends at step 218.

As detailed in FIG. 2, at least one embodiment of the invention can include considering previously-defined patterns stored in a KB. These patterns can include a variety of pattern types, such as detailed below. In addition, one or more embodiments of the invention can also include providing functionalities for users to manually define new patterns of organization by defining rules and adding excerpts of media content to train learning algorithms to identify new patterns.

Referring to example pattern types, as noted above, one such example pattern type can include a chronological pattern, which arranges information according to a progression of time, forward or backward. Additionally, a sequential pattern is similar to a chronological pattern, but arranges information according to a step-by-step sequence that describes a particular process. Using a sequential pattern, each section of information represents a step that one would follow in the actual process. As another example, a spatial pattern arranges information according to how elements fit together in physical space; that is, when one element exists in relation to another element. Topics involving geography are often organized using a spatial pattern.

Further, a compare-contrast pattern arranges information according to how two or more elements are similar to or different from one another. If the consumer is familiar with a first topic, producers can compare or contrast the first topic with a second topic to provide insight on the second topic. As yet another example, an advantages-disadvantages pattern organizes information about a topic by dividing the topic into advantageous and disadvantageous parts, which allows the consumer to weigh both aspects. A cause-effect pattern shows the different causes and effects of various conditions, while a problem-solution pattern divides information into two sections, one section that describes a problem and another section that describes a solution. Additionally, a topical pattern arranges information according to different sub-topics within a larger topic, or according to the types of elements that fall within a larger category.

Figure 3:
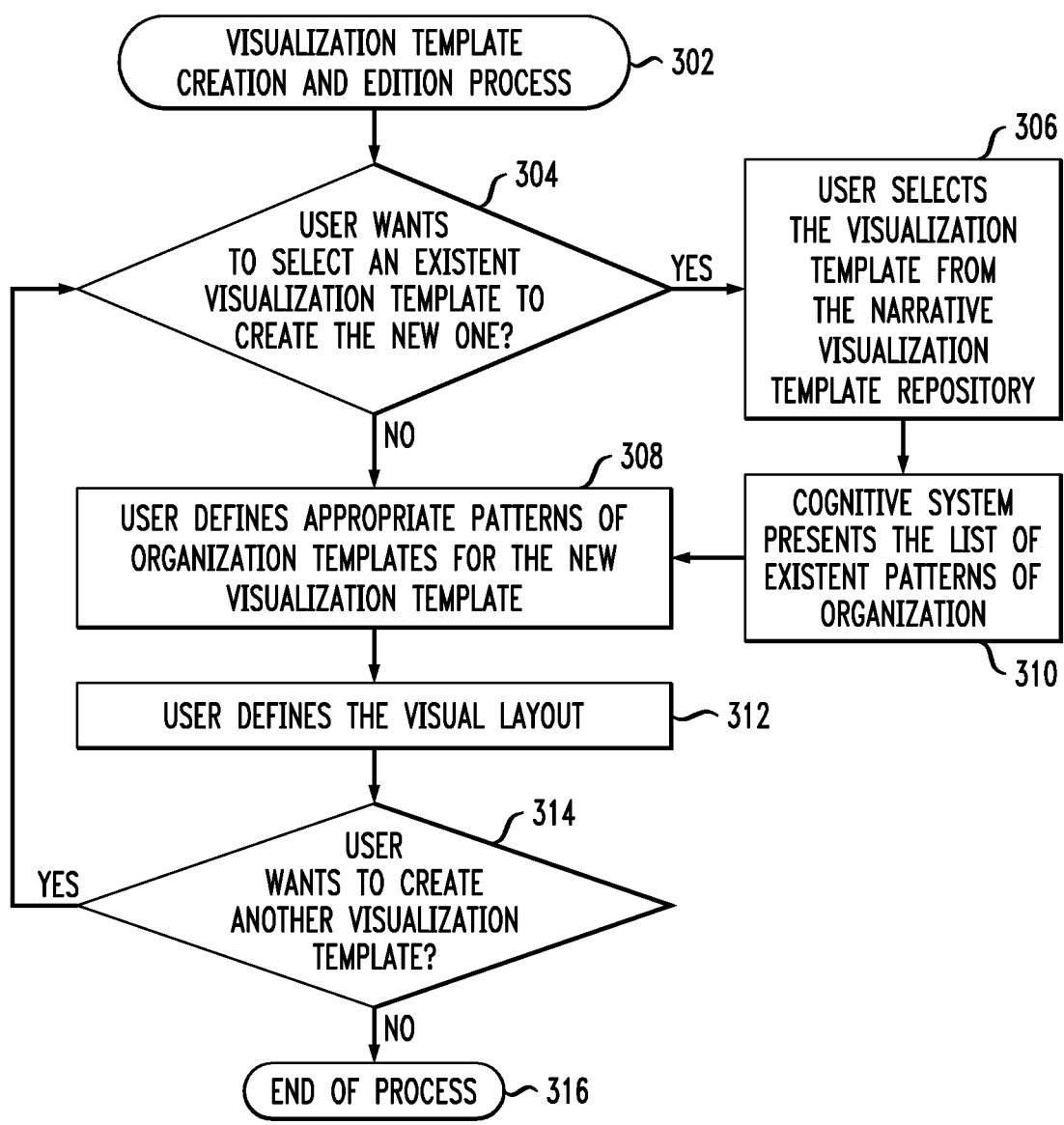
FIG. 3 is a flow diagram illustrating visualization template creation process techniques according to an embodiment of the present invention.

FIG. 3 is a flow diagram illustrating visualization template creation process techniques according to an embodiment of the present invention. Step 302 includes commencing a visualization template creation and edition process. Step 304 includes determining whether the user wants to select an existing visualization template to create the new template. If yes, then the workflow continues to step 306, in which the user selects the visualization template(s) from the narrative visualization template repository. Subsequent to step 306, step 310 includes the cognitive system (as further detailed in FIG. 4) presents a list of existing patterns of organization to the user, and step 308 includes the user defining one or more appropriate patterns of organization templates for the new visualization template. Referring back to step 304, if the noted query is answered in the negative, then the workflow proceeds directly to step 308.

Subsequent to step 308, step 312 includes the user defining the visual layout of the new visualization template. Step 314 includes determining whether the user wants to create another visualization template. If yes, then the workflow returns to step 304. If no, then the process ends at step 316.

As depicted in FIG. 3, in visualization template creation process, the user can select existing templates or create new templates from scratch. For each visualization template, the user defines appropriate patterns of organization and layout specifications to be used by a cognitive computing system (CCS). The CCS uses the defined rules and models for enriching audiovisual narratives.

Figure 4:
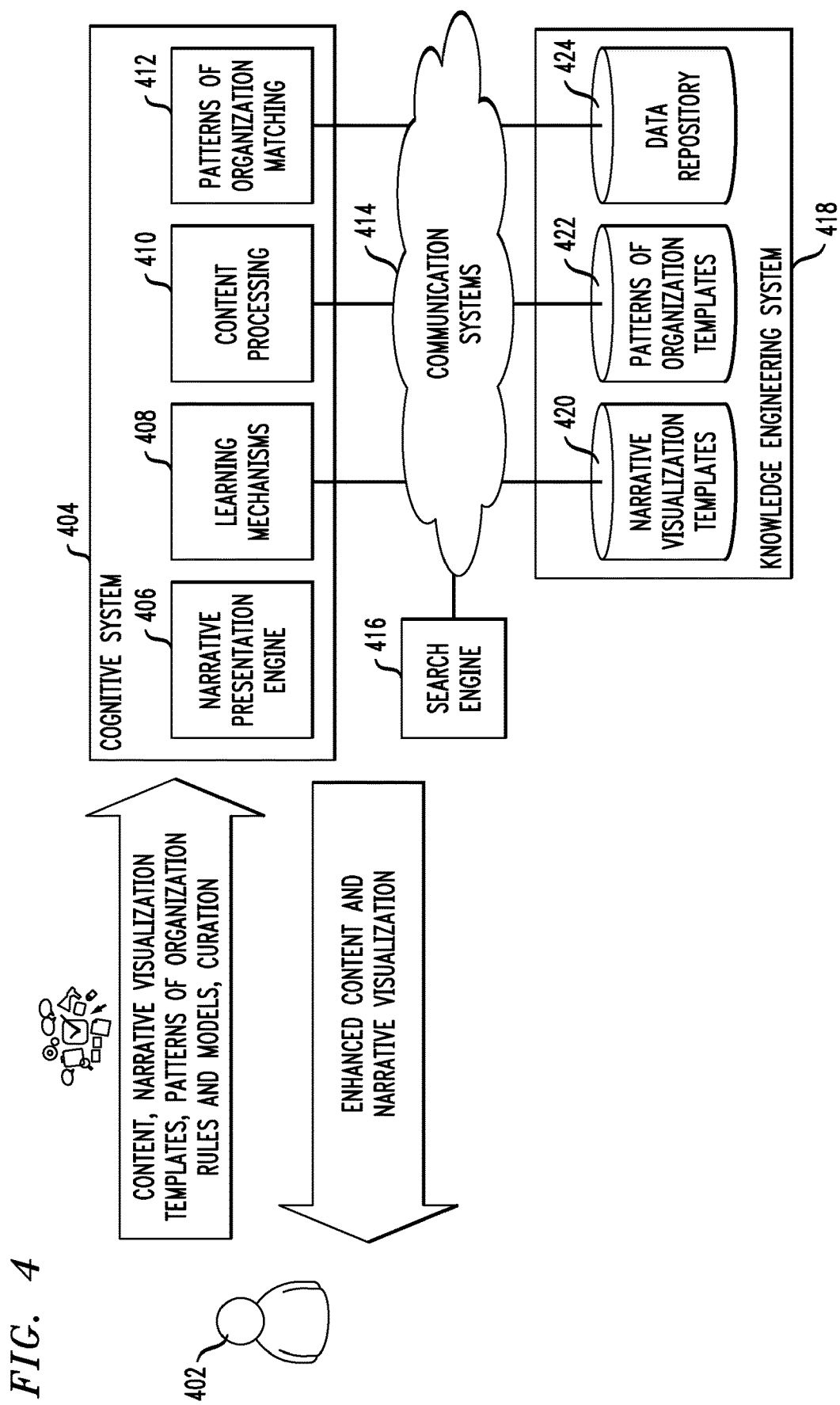
FIG. 4 is a diagram illustrating system architecture, according to an exemplary embodiment of the invention.

FIG. 4 is a diagram illustrating system architecture, according to an embodiment of the invention. By way of illustration, FIG. 4 depicts two logical subsystems, the CCS 404 and a knowledge engineering system (KES) 418. The CCS 404 provides intelligent content processing and learning capabilities, as well as commands search engines to fetch additional information. As depicted in FIG. 4, the CCS 404 includes four components: a content processing component 410, responsible for handling aspects of media format, transcoding, fusion and fission of media over different modalities; a patterns of organization matching and classification component 412 that is able to infer whether a given content embeds patterns of organization therein; a learning mechanisms component 408 with artificial intelligence (AI) functionalities and mechanisms to learn from user feedback over suggestions made by the system; and a narrative presentation engine 406, which considers visualization templates and user preferences to create a chronologically consistent and appealing narrative.

As also depicted in FIG. 4, the CCS 404 receives content, narrative visualization templates, patterns of organization rules and models, and/or curation information from a user 402, and ultimately provides to the user 402 enhanced content and at least one narrative visualization.

The KES 418, as depicted in FIG. 4, includes three components: a narrative visualization templates repository 420, which handles templates to be applied to visualizations of narratives; a patterns of organization templates repository 422, which handles available templates for patterns of organization; and a data repository 424 that stores both multimodal content as well as knowledge in the form of triples (such as resource description framework (RDF), etc.).

Additionally, as depicted in FIG. 4, the CCS 404 (specifically, the learning mechanisms component 408, the content processing component 410, and the patterns of organization matching and classification component 412) and the KES (repositories 420, 422, and 424) are networked through a communication system 414, along with a search engine 416. The search engine 410 can be used by any of the system's components to fetch relevant information via the Internet. For example, the learning mechanisms component 408 can retrieve public datasets, pre-trained predictive models, or other ancillary data available. Similarly, the content processing component 410 can search for audiovisual content with free licensing to enrich a narrative being constructed.

By way merely of example and illustration of one or more embodiments of the invention, consider two use cases. In the first use case, a producer perspective is highlighted. In a first step of the first use case, a producer wants to create a compelling audiovisual narrative using content available in the cloud. In a second step of the first use case, after inputting selected content, the system processes the content, attempting to detect any pattern of organization present in the content. In a third step, during the processing, the system identifies a pattern of organization (that is, a "topical pattern"). In a fourth step, the system can implement visualization templates previously defined for the pattern of organization in question. The system can select one of these templates if, for example, the user preferences indicate that such a template is the user's preferred selection. In a fifth step, the system applies the selected visualization template to the narrative. Similar steps can also be executed to other detected patterns in the content. Further, in a sixth step, after processing all of the content, the system presents a chronologically-consistent narrative, with suggested organizational enhancements. The producer can provide his or her feedback, accepting or rejecting the suggestions. The system can then also register the narrative and learn from user feedback.

In the second use case, a consumer perspective is highlighted. In a first step of the second use case, a viewer/consumer selects audiovisual content, for example, using a web player. In a second step, the system detects a pattern of organization and applies a selected visualization template to the narrative in real-time. Similar steps can also be executed to other detected patterns in the content. Additionally, in a third step, a dashboard is generated and/or implemented that allows viewers to select desired visualization characteristics for audiovisual enhancement.

Figure 5:
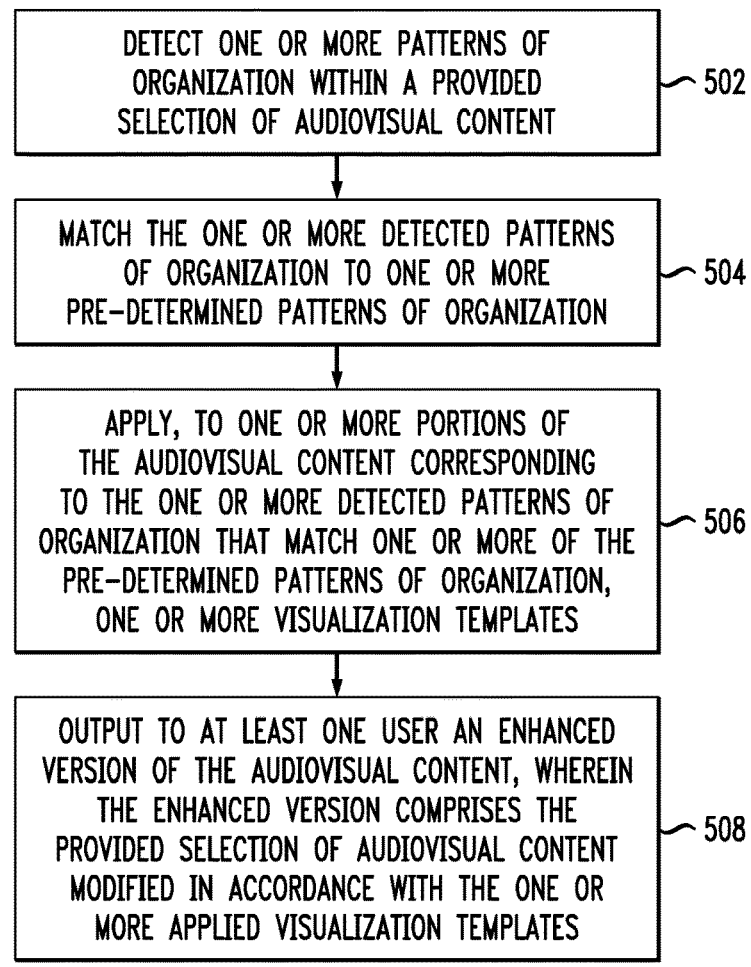
FIG. 5 is a flow diagram illustrating techniques according to an embodiment of the invention.

FIG. 5 is a flow diagram illustrating techniques according to an embodiment of the present invention. Step 502 includes detecting one or more patterns of organization within a provided selection of audiovisual content. Detecting can include processing the provided selection of audiovisual content with cognitive computing support. Additionally, detecting can also include identifying, within the provided selection of audiovisual content, one or more pre-determined concepts, implementing one or more speech-to-text techniques, implementing one or more visual recognition techniques, analyzing associated metadata from the provided selection of audiovisual content, and/or applying one or more statistical models to the provided selection of audiovisual content to identify one or more patterns of organization.

Step 504 includes matching the one or more detected patterns of organization to one or more pre-determined patterns of organization. Step 506 includes applying, to one or more portions of the audiovisual content corresponding to the one or more detected patterns of organization that match one or more of the pre-determined patterns of organization, one or more visualization templates, wherein the one or more visualization templates comprise one or more items of additional audiovisual content, and wherein the one or more visualization templates are associated with the one or more pre-determined patterns of organization. The one or more items of additional audiovisual content can be fetched from a search engine and/or provided via user input.

Additionally, the one or more visualization templates can be based on historical data pertaining to separate enhanced versions of audiovisual content, user history information and/or one or more user preferences. Further, the one or more visualization templates can also include one or more datasets and/or one or more pre-trained statistical models.

Step 508 includes outputting to at least one user an enhanced version of the audiovisual content, wherein the enhanced version comprises the provided selection of audiovisual content modified in accordance with the one or more applied visualization templates.

The techniques depicted in FIG. 5 can also include enabling the at least one user to input the provided selection of audiovisual content via a graphical interface. Additionally, one or more embodiments of the invention can include enabling the at least one user to modify the one or more applied visualization templates, and enabling the at least one user to choose one or more alternatives to the one or more applied visualization templates. Further, at least one embodiment of the invention can include enabling the at least one user to modify the enhanced version of the audiovisual content, and learning from each user modification for use in subsequent iterations of enhanced versions of audiovisual content.

At least one embodiment of the invention (such as the techniques depicted in FIG. 5, for example), can include implementing a service via a transmission server to receive data from a data source and send selected data to users (for example, at a provided destination address of a wireless device (such as a number for a cellular phone, etc.)). The transmission server includes a memory, a transmitter, and a microprocessor. Such an embodiment of the invention can also include providing a viewer application to the users for installation on their individual devices. Additionally, in such an embodiment of the invention, after a user enrolls, the service receives audiovisual content sent from a data source to the transmission server. The server can process the information, for example, based upon user-provided user preference information that is stored in memory on the server. Subsequently, an alert is generated containing an appealing audiovisual narrative based on the audiovisual content. The alert can be formatted into data blocks, for example, based upon any provided alert format preference information. Subsequently, the alert and/or formatted data blocks are transmitted over a data channel to the user's wireless device. After receiving the alert, the user can connect the wireless device to the user's computer, whereby the alert causes the user's computer to automatically launch the application provided by the service to display the alert. When connected to the Internet, the user may then use the viewer application (for example, via clicking on a URL associated with the data source provided in the alert) to facilitate a connection from the remote user computer to the data source over the Internet for additional information.

The techniques depicted in FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 6:
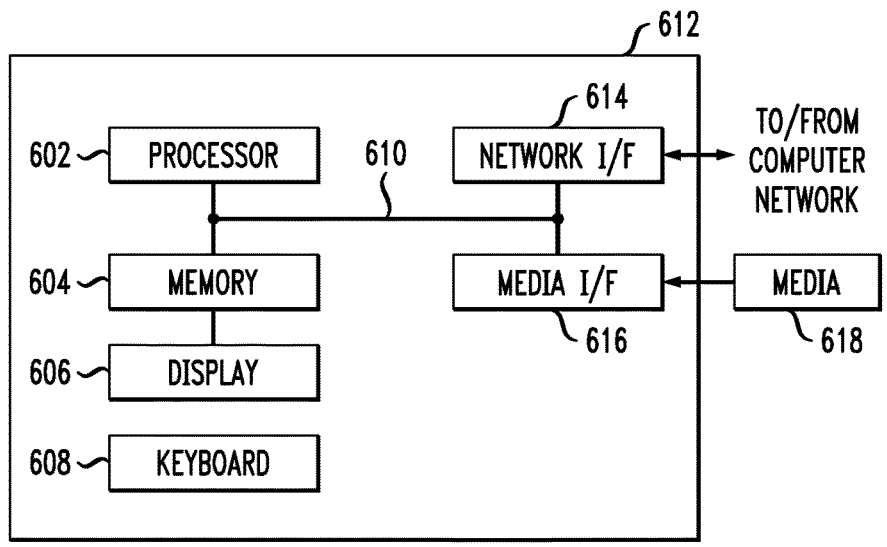
FIG. 6 is a system diagram of an exemplary computer system on which at least one embodiment of the invention can be implemented.

Additionally, an embodiment of the present invention can make use of software running on a computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
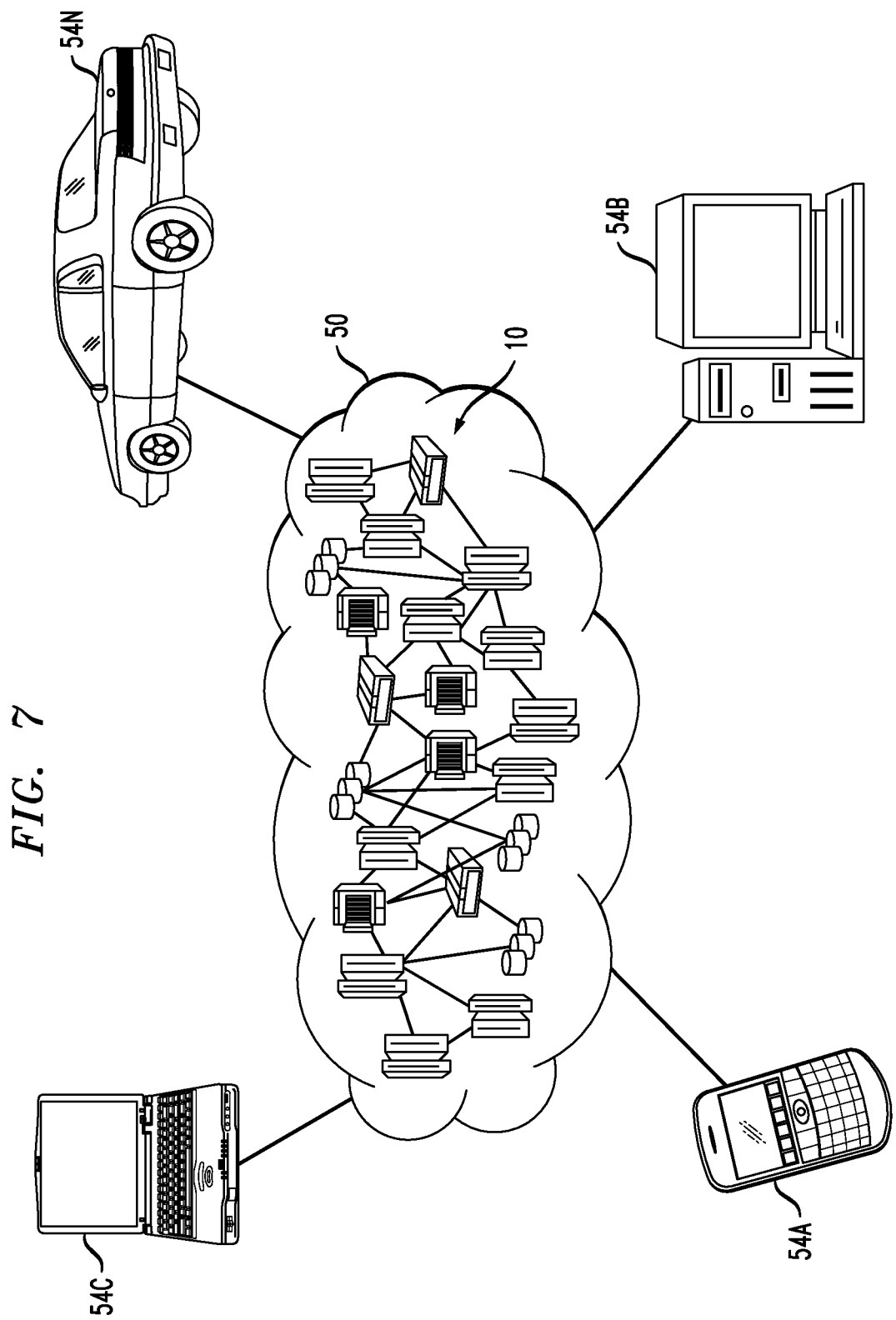
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
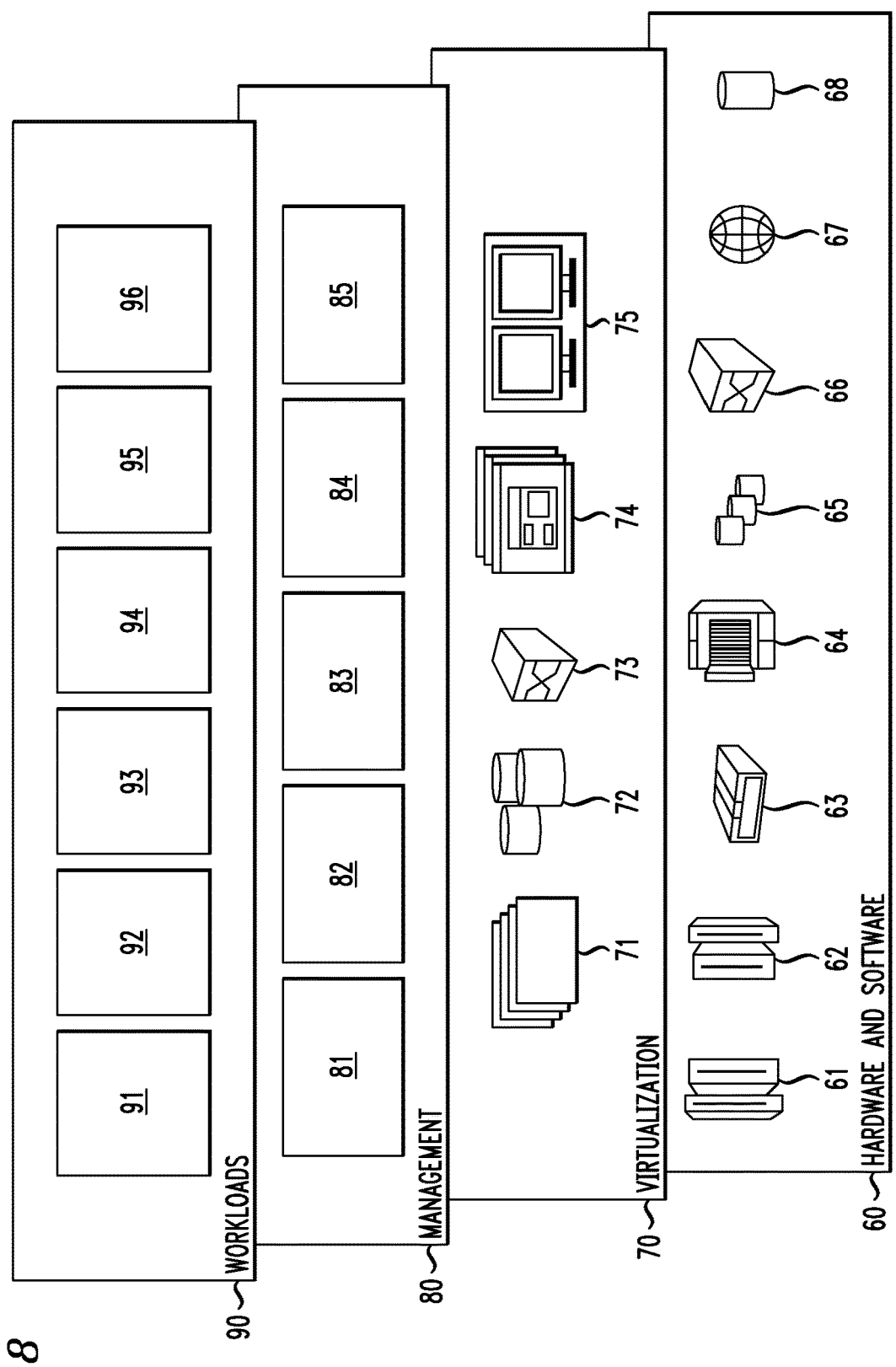
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and narrative visualization creation 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, automatically detecting particular narrative structures in a video using a learning process, in conjunction with superposition of visualizations (based on these structures) atop the video, with the nature of the visualizations learned to be useful for a particular user or group.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:

detecting one or more patterns of organization within a provided selection of audiovisual content;

matching the one or more detected patterns of organization to one or more pre-determined patterns of organization;

applying, to one or more portions of the audiovisual content corresponding to the one or more detected patterns of organization that match one or more of the pre-determined patterns of organization, one or more visualization templates, wherein the one or more visualization templates comprise one or more items of additional audiovisual content, and wherein the one or more visualization templates are associated with the one or more pre-determined patterns of organization; and outputting to at least one user an enhanced version of the audiovisual content, wherein the enhanced version comprises the provided selection of audiovisual content modified in accordance with the one or more applied visualization templates;

wherein the method is carried out by at least one computing device.

2. The computer-implemented method of claim 1, wherein said detecting comprises processing the provided selection of audiovisual content with cognitive computing support.

3. The computer-implemented method of claim 1, wherein said detecting comprises identifying, within the provided selection of audiovisual content, one or more pre-determined concepts.

4. The computer-implemented method of claim 1, wherein said detecting comprises implementing one or more speech-to-text techniques.

5. The computer-implemented method of claim 1, wherein said detecting comprises implementing one or more visual recognition techniques.

6. The computer-implemented method of claim 1, wherein said detecting comprises analyzing associated metadata from the provided selection of audiovisual content.

7. The computer-implemented method of claim 1, wherein said detecting comprises applying one or more statistical models to the provided selection of audiovisual content to identify one or more patterns of organization.

8. The computer-implemented method of claim 1, wherein the one or more items of additional audiovisual content are at least one of fetched from a search engine and provided via user input.

9. The computer-implemented method of claim 1, wherein the one or more visualization templates comprise at least one of one or more datasets and one or more pre-trained statistical models.

10. The computer-implemented method of claim 1, wherein the one or more visualization templates are based on historical data pertaining to separate enhanced versions of audiovisual content.

11. The computer-implemented method of claim 1, wherein the one or more visualization templates are based on at least one of user history information and one or more user preferences.

12. The computer-implemented method of claim 1, comprising:
enabling the at least one user to input the provided selection of audiovisual content via a graphical interface.

13. The computer-implemented method of claim 1, comprising:
enabling the at least one user to modify the one or more applied visualization templates.

14. The computer-implemented method of claim 1, comprising:
enabling the at least one user to choose one or more alternatives to the one or more applied visualization templates.

15. The computer-implemented method of claim 1, comprising:
enabling the at least one user to modify the enhanced version of the audiovisual content.

16. The computer-implemented method of claim 15, comprising:
learning from each user modification for use in subsequent iterations of enhanced versions of audiovisual content.

17. A computer program product comprising a non-transitory computer readable storage medium having program instructions embodied therewith, the program instructions executable by a computing device to cause the computing device to:
detect one or more patterns of organization within a provided selection of audiovisual content;
match the one or more detected patterns of organization to one or more pre-determined patterns of organization;
apply, to one or more portions of the audiovisual content corresponding to the one or more detected patterns of organization that match one or more of the pre-determined patterns of organization, one or more visualization templates, wherein the one or more visualization templates comprise one or more items of additional audiovisual content, and wherein the one or more visualization templates are associated with the one or more pre-determined patterns of organization; and
output to at least one user an enhanced version of the audiovisual content, wherein the enhanced version comprises the provided selection of audiovisual content modified in accordance with the one or more applied visualization templates.

18. The computer program product of claim 17, wherein the program instructions executable by a computing device further cause the computing device to:
enable the at least one user to modify the enhanced version of the audiovisual content; and
learn from each user modification for use in subsequent iterations of enhanced versions of audiovisual content.

19. A system comprising:
a memory; and
at least one processor operably coupled to the memory and configured for:
detecting one or more patterns of organization within a provided selection of audiovisual content;
matching the one or more detected patterns of organization to one or more pre-determined patterns of organization;
applying, to one or more portions of the audiovisual content corresponding to the one or more detected patterns of organization that match one or more of the pre-determined patterns of organization, one or more visualization templates, wherein the one or more visualization templates comprise one or more items of additional audiovisual content, and wherein the one or more visualization templates are associated with the one or more pre-determined patterns of organization; and
outputting to at least one user an enhanced version of the audiovisual content, wherein the enhanced version comprises the provided selection of audiovisual content modified in accordance with the one or more applied visualization templates.

20. The system of claim 19, wherein the at least one processor is further configured for:
enabling the at least one user to modify the enhanced version of the audiovisual content; and learning from each user modification for use in subsequent iterations of enhanced versions of audiovisual content.

\* \* \* \* \*